United States Patent [19]

Pluss

[11] Patent Number: 4,981,621
[45] Date of Patent: Jan. 1, 1991

[54] REGULAR PACKING ELEMENT OF THIN FOIL-LIKE MATERIAL FOR MASS TRANSFER AND HEAT EXCHANGE COLUMNS

[75] Inventor: Raymond Pluss, Klein-Andelfingen, Switzerland

[73] Assignee: Sulzer Brother Limited, Winterthur, Switzerland

[21] Appl. No.: 512,864

[22] Filed: Apr. 23, 1990

Related U.S. Application Data

[63] Continuation of Ser. No. 821,398, Jan. 22, 1986, abandoned.

[30] Foreign Application Priority Data

Jan. 30, 1985 [CH] Switzerland ...................... 00406/85

[51] Int. Cl.$^5$ ................................................ B01F 3/04
[52] U.S. Cl. .................................................. 261/112.2
[58] Field of Search .................................... 261/112.2

[56] References Cited

U.S. PATENT DOCUMENTS

| | | | |
|---|---|---|---|
| 3,106,242 | 10/1963 | Jenssen et al. | 261/112 |
| 3,235,234 | 2/1966 | Beaudoin | 261/112 |
| 3,739,556 | 6/1973 | Waters | 261/112 |
| 3,775,234 | 11/1973 | Rich | 261/112 |
| 3,785,620 | 1/1974 | Huber | 261/112 |
| 4,186,159 | 1/1980 | Huber | 261/112 |
| 4,361,426 | 11/1982 | Carter et al. | 261/112 |
| 4,374,542 | 2/1983 | Bradley | 261/112 |
| 4,548,766 | 10/1985 | Kinney, Jr. | 261/112 |

FOREIGN PATENT DOCUMENTS

| | | | |
|---|---|---|---|
| 3222892 | 12/1983 | France | 261/112 |
| 3239510 | 4/1984 | France | 261/112 |
| 160176 | 9/1979 | Netherlands | 261/112 |
| 398503 | 3/1966 | Switzerland . | |
| 412806 | 11/1966 | Switzerland . | |
| 990851 | 5/1965 | United Kingdom | 261/112 |
| 2035831 | 6/1980 | United Kingdom | 261/112 |

OTHER PUBLICATIONS

American Heritage Dictionary, 2nd College Ed., Apr. 1982, p. 258.

*Primary Examiner*—Tom Mile
*Attorney, Agent, or Firm*—Kenyon & Kenyon

[57] ABSTRACT

A regular packing element for mass transfer and heat exchange columns has coarsely folded layers each being made of a thin foil-like material such as sheet metal. Both the front and back surfaces of the layers are provided with an identical fine structuring or patterning defining a network of crossing channels with bases. The channels are bounded by the flanks of, for example, pyramidal protuberances and depressions.

Because of the fine structuring, the liquid flowing along the channels is distributed uniformly over the surfaces of the layers by capillary action and gravity. Also, satisfactory cross-mixture of the liquid occurs since liquid can flow between channels at the channel intersections.

15 Claims, 6 Drawing Sheets

0,5 10,0 44,6 35,7 8,0 1,2

44,2 53,3 2,5

65,6 34,4

REGULAR PACKING ELEMENT OF THIN FOIL-LIKE MATERIAL FOR MASS TRANSFER AND HEAT EXCHANGE COLUMNS

This is a continuation of application Ser. No. 821,398 filed Jan. 22, 1986, now abandoned.

This invention relates to a regular packing element. More particularly, this invention relates to a regular packing element made of thin foil-like material for use in mass transfer and heat exchange columns.

As is known, various types of regular packing elements having an ordered structure, for example as described in Swiss Patent No. 398,503 have been used for mass transfer columns as well as for heat exchange columns in order to produce an exchange between a descending liquid phase and and ascending gas phase. It has also been known from Swiss Patent No. 412,806 to produce regular regular packing elements for a mass transfer column wherein the element layers which are operative as the support surfaces for the descending liquid are made of a specially dimensioned metal fabric. The purpose of this is to ensure that there is a uniform wetting of the fabric by the liquid due to the specific properties of the fabric. However, metal fabrics of this type are expensive and subject to corrosion. In addition, these fabrics have other considerable disadvantages when used for regular packing elements. For example, lateral propogation of the liquid on the fabric is brought about mainly by capillary forces. Hence, only relatively little liquid can be conveyed. Also, capillary action can occur only in one direction. That is, either between the warp wires or yarns or between the weft wires or yarns. Accordingly, there is no cross mixing of the liquid. Further, mass transfer can not be optimized because of the substantial holdup which is synonomous with a relatively thick liquid film.

It has also been known from German O.S. 3222892 to enhance the uniformity of liquid distribution by having the layers of a regular packing element in the form of laminations which are provided on at least one side with a number of projections or protuberances of a height of the order of magnitude of one millimeter and which are spaced apart from one another by a distance of approximately the same order of magnitude. This construction provides a pin-ball effect to enhance cross-mixing of the trickled over surfaces. However, wetting of the surfaces is impaired because of the absence of continuous capillary channels, particularly if the projections are present on the only one side of the layers. If the layers have projections on both sides, the resulting depressions cause a disturbance since the liquid stagnates in the depressions and, thus, causes serious disadvantages.

Accordingly, it is an object of the invention to provide a regular packing element having improved wetting properties.

It is another object of the invention to provide a regular packing element which is able to provide uniform liquid distribution without disturbing edge effects.

It is another object of the invention to provide a regular packing element with an appropriate surface structure to effect a good cross-mixing of a descending liquid phase.

It is another object of the invention to provide a regular packing element which has a patterned surface in which hold-up is reduced with a resulting improvement in mass transfer or heat exchange.

Briefly, the invention provides a layer of foil-like material for a regular packing wherein the layer is provided with a patterned front containing a plurality of protuberances and depressions of greater height and depth, respectively, than the thickness of the material as well as a patterned back of identical structure to the front with each of the back and front defining continuous crossing channels. In addition, the crossing channels are disposed in symmetric relation about a common axis.

The invention also provides a method of forming a patterned surface in a foil-like material. To this end, the method includes the steps of positioning a pair of tools having identical facing surfaces of contiguous protuberances with the tips of the protuberances of one tool disposed centrally between the tips of the protuberances of the other tool, and of thereafter deep-drawing a foil-like layer of material between the tools to define identical patterned surfaces on the front and back of the layer of material. For example, the tools may be in the form of press plates which are mounted for movement towards each other during the deep-drawing step. In this case, the foil-like layer can be moved stepwise between the pressed plates when the plates are spaced apart.

The tools may also be in the form of driven rolls while the foil-like layer is guided through and between the rolls.

The term "continuous channels" is intended to denote a structure wherein the channel bottoms always have continuous side walls so that there is nowhere any interruption in the capillary action.

The channel-bounding protuberances and depressions can have a variety of shapes. For example, they can be pyramidal or trunco-pyramidal or frustum-shaped or part-spherical.

Because of the structuring of the foil surfaces, the liquid is distributed uniformly along the channels and over the trickle surfaces of the packing elements by capillary and gravity forces. Liquid can flow from channel to channel at the intersections, thus ensuring satisfactory cross-mixing.

Also, the symmetrical flow of the liquid over the trickle surfaces obviates unwanted edge effects likely to impair mass transfer or heat exchange between the liquid phase and the gas phase.

It has been found in practice that regular packing elements constructed of the pattern foil-like layers have surprisingly good mass transfer properties even for liquids which have difficulty in wetting and materials which are difficult to wet, such as aqueous solutions on stainless steel.

When uniform liquid propagation is desirable, it is very advantageous in the assembly of the regular packing elements if the axis of the structure extends substantially parallel to the fall line of the liquid descending in the column.

Advantageously, the channels include an angle of from 20° to 70° to the axis of the structure. Advantageously, the width of the channels is from 1 to 5 millimeters (mm) and the depth of the channels is from 0.2 to 2 millimeters (mm).

These and other objects and advantages of the invention will become more apparent from the following detailed description taken in conjunction with the accompanying drawings wherein.

Figure 4:
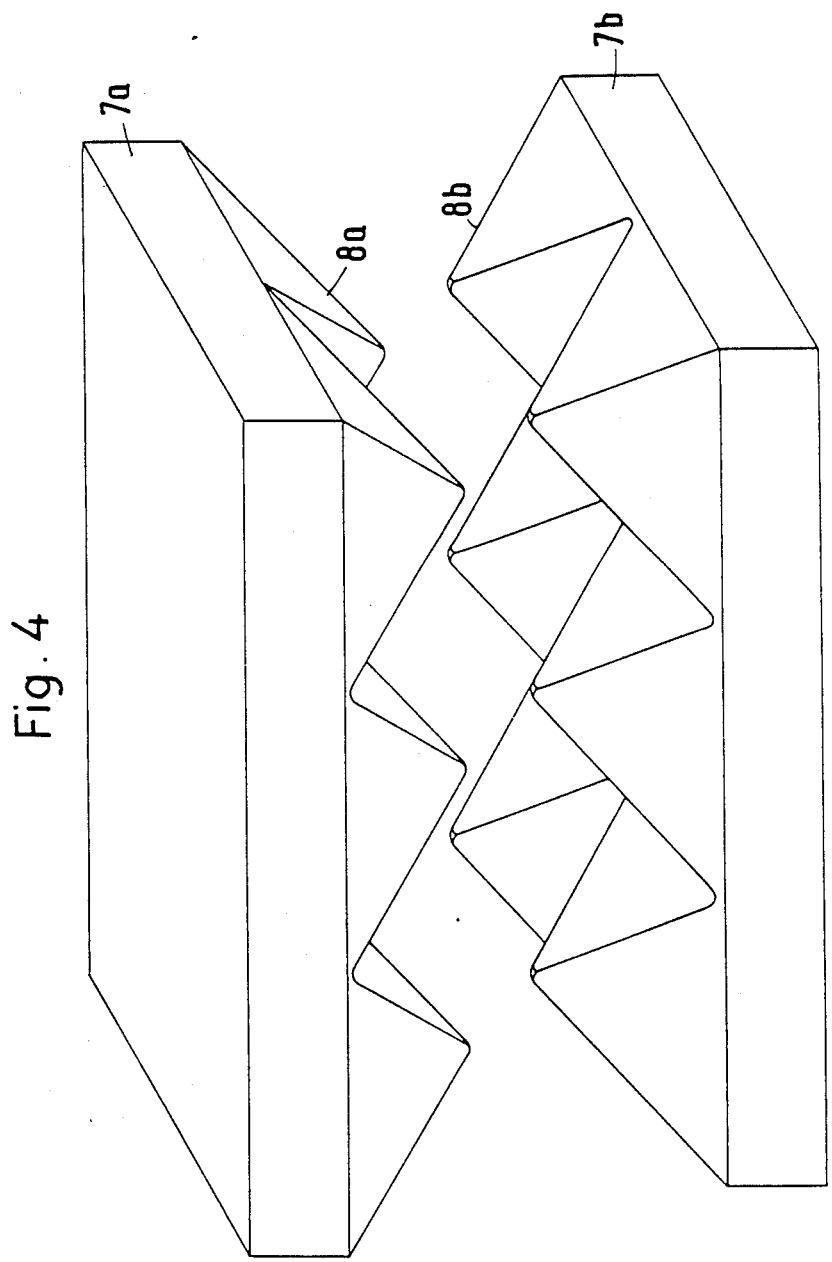
Figure 5:
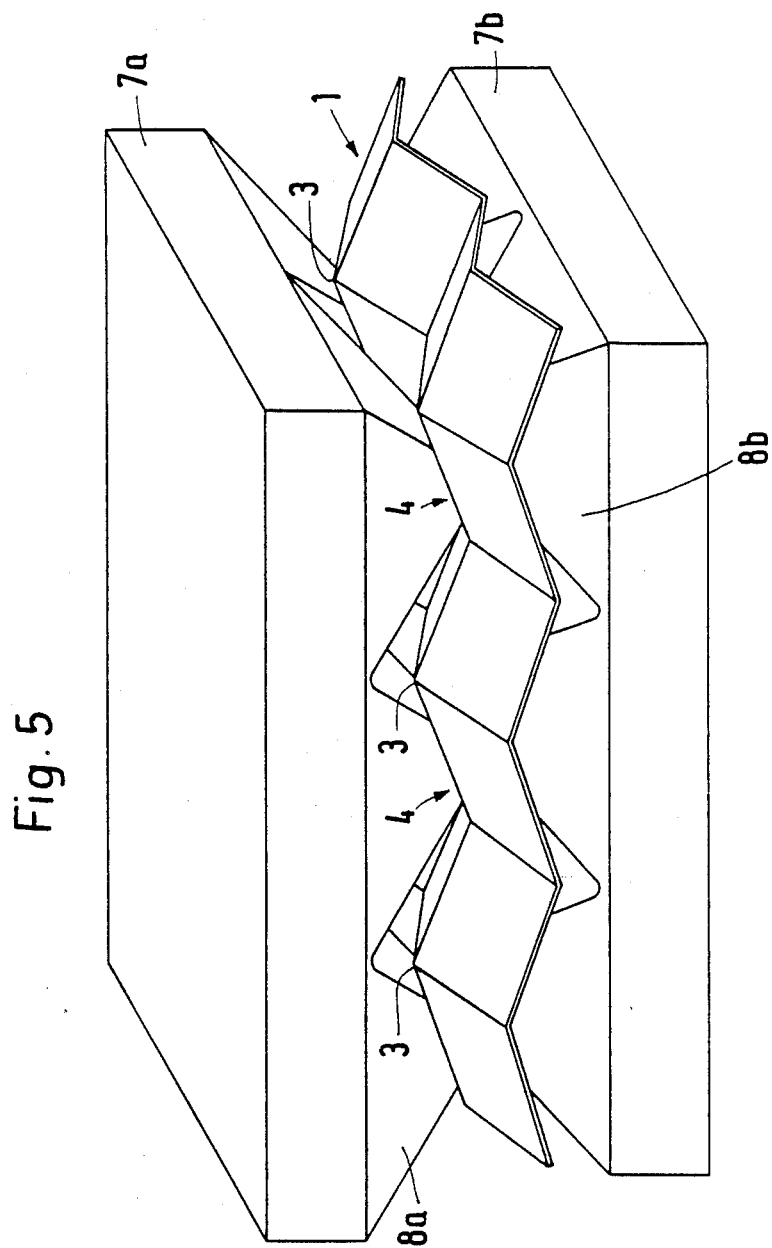
Figure 6:
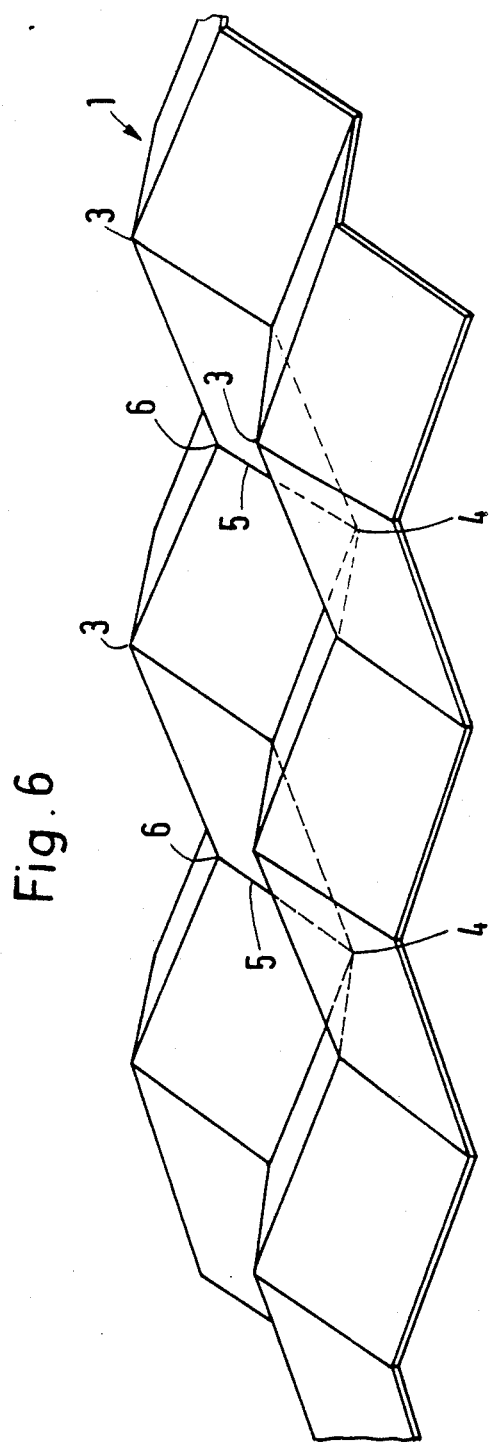
Figure 7:
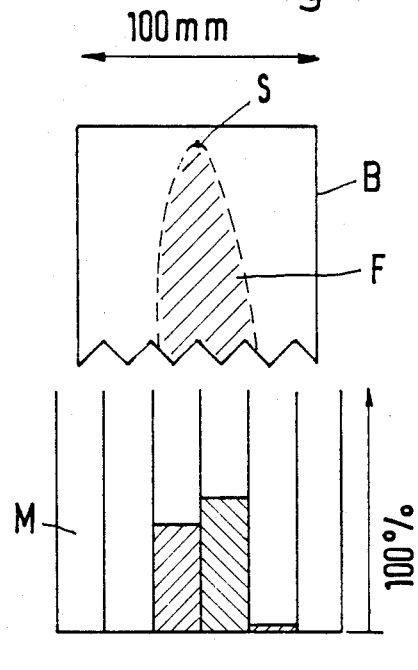
Figure 9:
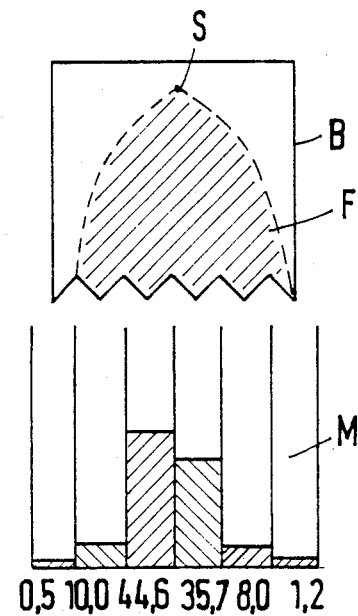
Figure 8A:
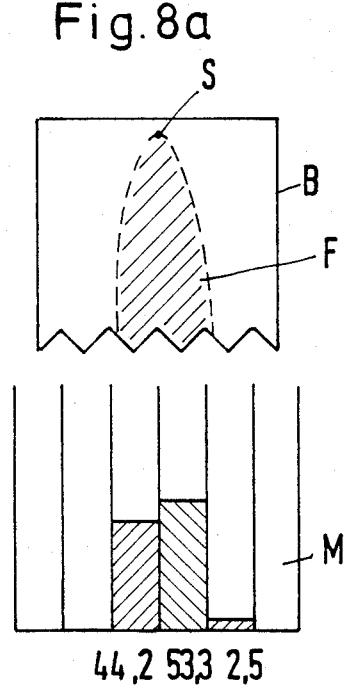
Figure 8B:
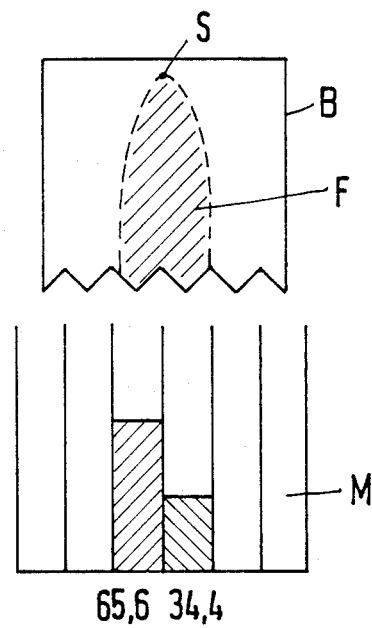

FIG. 4 diagrammatically illustrates a part of two structured plates of a press in an open position of use for producing a structured foil according to the invention;

FIG. 5 shows the two plates of FIG. 4 with a structured foil they have produced in the closed position;

FIG. 6 illustrates a part of the patterned foil in a horizontal position;

FIG. 7 diagrammatically illustrates a test rig for testing a packing element;

FIG. 8a diagrammatically illustrates the test rig of FIG. 7 with a known lamination;

FIG. 8b diagrammatically illustrates the test rig with a further known lamination; and FIG. 9 illustrates the test rig with a lamination in accordance with the invention.

Figure 1:
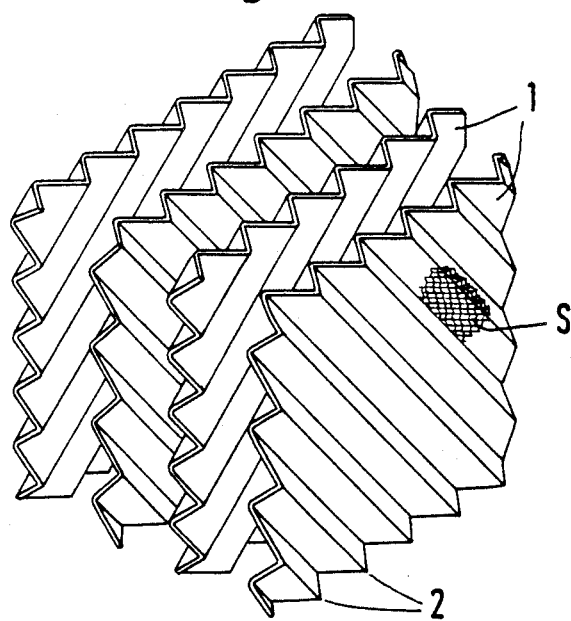
FIG. 1 illustrates an axionometric and diagrammatic view of part of a regular packing element.

Referring to FIG. 1, part of the regular packing element has four layers 1 each of which is corrugated to define coarse folds or creases 2. To simplify the drawing, the layers 1 are shown in spaced relation to one another. A part s shows the structuring of the layer trickle surfaces.

Figure 2:
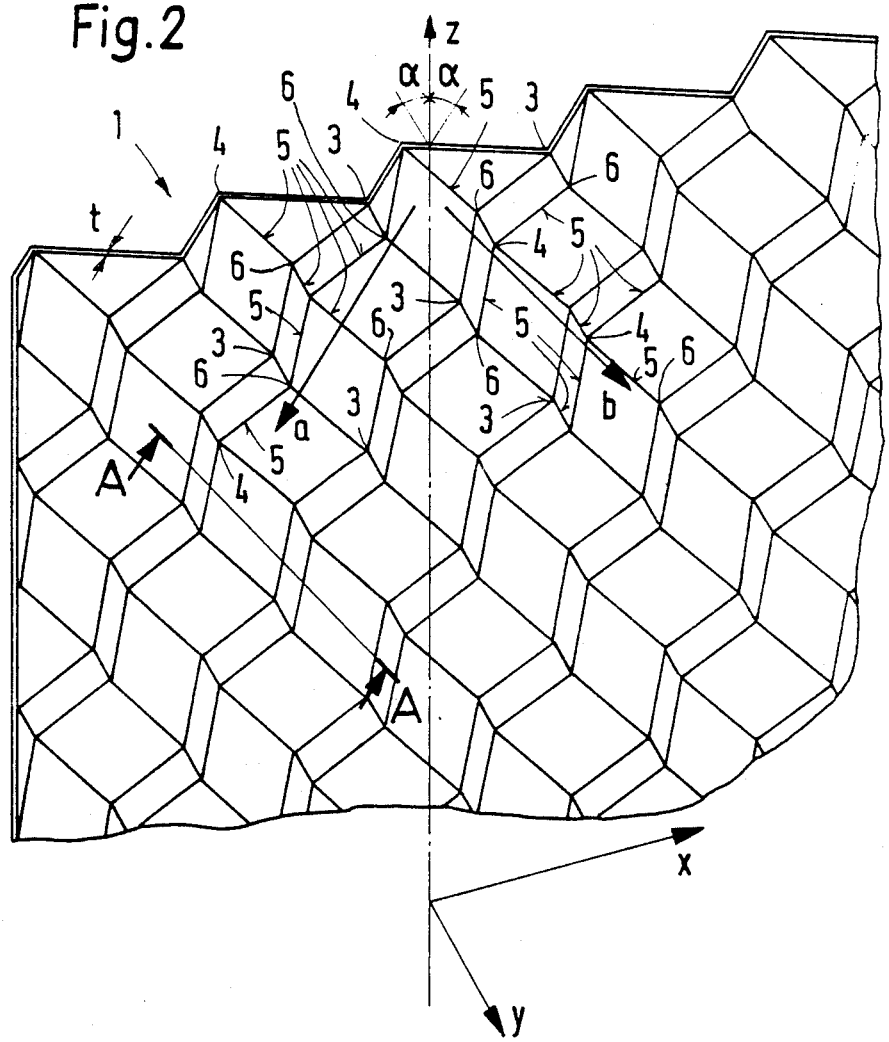
FIG. 2 illustrates an axionometric view of part of an unfolded layer in an upright position and having a patterned surface in accordance with the invention.

Referring to FIG. 2, prior to being folded into a corrugated shape, each layer 1 which is of foil-like material made, for example, of metal, such as copper or stainless steel or monel metal or the like or of plastics, has a sharp material thickness t. In addition, both the front and the back of the layer 1 is pattered to define protuberances 3 and depressions 4. As shown, the protuberances 3 and depressions 4 are in the form of quadrilateral pyramids. The pyramids are arranged not with the base edges of adjacent pyramids in side-by-side relationship but with their side edges directed towards one another. The pyramid flanks bound continuous V-shaped channels, the lines of intersections of the channel flanks forming channel bottoms 5.

Four contiguous flanks of the pyramids 3 bound a pyramidal depression 4. Consequently, a depression 4 on one side of the foil corresponds to a protuberance 3 on the other side of the foil. Identical structures are therefore present on both sides of the foil.

The channels cross one another in the depressions 4 and extend by way of saddles 6 formed by the pyramids 3 to the next depressions 4. Arrows a and b show the main directions of the channels in which liquid can be guided when the layer 1 is incorporated in a packing element. Each such direction a, b includes an equal angle $\alpha$ with a common axis z. For example, the angle $\alpha$ may be in the range of from 20° to 70°.

For a better understanding, FIG. 2 indicates the coordinate axes x, y and z used for the axionometric illustration, the foil surface extending in the plane x, z while the tips of the protuberances 3 and the troughs of the depressions 4 extend in the direction of the y axis.

Figure 3:
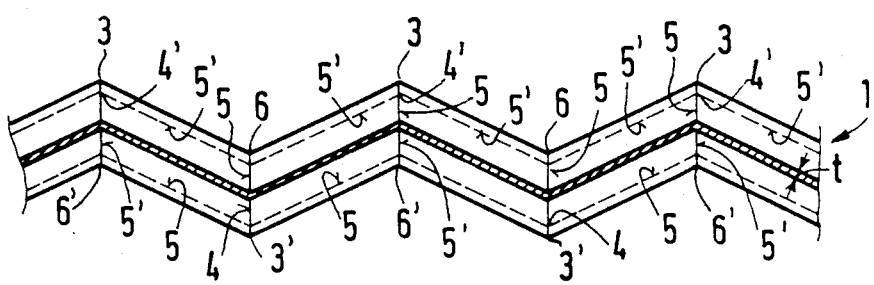
FIG. 3 illustrates a view taken on line A—A of FIG. 2.

Referring to FIG. 3, wherein like reference characters indicate like parts as above, the back of the foil has protuberances 3', depressions 4', channel bottoms 5' and saddles 6'.

The continuous channels permit capillary forces to be operative and thus enable wettability to be enhanced.

Because of the inclination of the channels relative to the axis z, the force of gravity can also be operative on a descending liquid, so that the liquid is conveyed in the channels by more than the mere force of capillary action. This kind of liquid conveyance obviates backup and holdup.

Channels having opposite inclinations cross one another in the depressions, so that liquid flows are equalized and differences in concentration can be evened out. Consequently, the liquid is distributed very uniformly and liquid concentrations and liquid temperatures are evened out.

Since the channels extend to and away from the depressions without transition, the liquid does not stagnate in the depressions. Thus, the disadvantages associated with such stagnation, such as thermal dissociation, soiling and inefficiently used exchange surfaces, are obviated.

The same advantages can apply when, for example, in extraction processes, two liquid phases are brought into contact with one another.

The protuberances and depressions can have different shapes, with the preference being for pyramids, more particularly quadrilateral or hexagonal pyramids.

Structured surfaces are, as a rule, produced by a deep-drawing operation with the use either of a press or of rolls. The shape of the tools is basically a negative, i.e. a negative image, of the required structure. The required geometry of the tool surfaces is as a rule produced by milling or planing or grinding or turning.

However, since the channels do not extend parallel to the foil plane but project therefrom on both sides—i.e. they alternately project therefrom and are recessed therein—and since the structure is fine and has sharp narrow contours, the production processes just mentioned cannot be used.

Thus, the patterned foil-like layers are produced by a deep-drawing operation using presses or rolls and tools which need not have the negative of the structure.

In an advantageous method of producing the patterned foil-like layer in a deep-drawing operation using two tools, the tool surfaces are in the form of contiguous protuberances, such that the tips of the protuberances of one tool are disposed centrally between the tips of the protuberances of the other tool.

For example, if the structure is embodied by quadrilateral pyramids, the tool surfaces can also be devised from quadrilateral pyramids, the side edges of adjacent pyramids not being directed towards one another, the base edges being disposed in side-by-side relationship instead. Consequently, the pyramid can be produced just by milling V-shaped grooves since the grooves have a constant depth in relation to the pyramid tips. In this form of production, the surfaces of the foil structuring are not determined by the tool surfaces; instead, the surfaces of the foil structure are stressed by the tips of the protuberances of the tools.

This simple production method enables structures of almost any required fineness to be produced with the required accuracy and with adequately sharp contours.

Referring to FIG. 4, two plate-like tools 7a, 7b are shown in their open position. The tools are fitted to a press in a manner which is not shown. The tool surfaces have laterally contiguous pyramids 8a, 8b; these surfaces can be produced in a simple manner by miling or planing.

FIG. 5 shows part of the tools of FIG. 4 but in a closed position and with a part of a finished foil layer 1.

To produce a pyramidal depression in the foil layer 1, pyramids 8b disposed in a square and forming part of the tool 7b are operative on the base surface of the pyramidal depression 4 while the trough thereof is determined by a central pyramid 8a of the tool 7a, the corner points of the base surface of the recesses 4 becoming tips of the contiguous pyramidal protuberances 3.

Similar considerations of course apply to the other side of of the foil layer 1, the corresponding reference numbers being primed in FIG. 3 while the letters associated with the reference numbers of the tools "a" and "b" must be reversed.

FIG. 6 shows a part of a finished foil layer 1 while still unfolded (reference numbers as in FIG. 2).

If the foils are to be produced by rolling instead of by pressing, what has been said in the foregoing about the plate-like tools of a press applies to the treatment of the two roll surfaces.

These methods of production are suitable for plastically deformable foils.

The structuring of the layer surfaces also consolidates the material, thus enabling thinner and cheaper foils to be used.

If regular packing elements which are required to be as in FIG. 1 are being produced, the structured foils are folded and the cut-to-size layers are joined together to form a regular packing element.

In general as in this example, the geometric dimensions—of the folding in this case—are considerably greater than the geometric dimensions of the fine structure of each layer.

Foils having structures of this kind can be produced by injection moulding or pressing when, for example, plastics or ceramic materials are used.

Fine structures according to the invention can be used with advantage wherever it is required to produce uniform trickle films of liquid.

NUMERICAL EXAMPLES

The distribution effect of the liquid phase on the trickle surfaces of a foil layer devised in accordance with DE-OS No. 3 222 892 will be compared hereinafter, on the basis of experiments, with a foil layer according to the invention.

The articles used for the test were bottom-toothed metal plates or laminations 100 millimeters (mm) high and 100 millimeters (mm) wide. The height of the corrugation length was approximately 1 millimeter (mm) and the distances between two corrugation crests were in each case approximately 3 millimeters (mm).

The test liquid used was acetone applied at a rate of 12 milliliters per minute (ml/min) in spots at the place S.

The laminations were cleaned beforehand with acetone, dried with a hot-air blower, then completely wetted with acetone.

The test rig is shown diagrammatically in FIG. 7.

The liquid applied to the place S on a lamination B spread over the hatched surface F and flowed into measuring cylinders M which were disposed underneath and which each have a diameter of 20 millimeters (mm).

FIGS. 8a and 8b show the test rig and the test results for a lamination in accordance with DE-OS No. 3 222 892. This kind of lamination has different structures on the front and on the back, since the depressions on the back correspond to the wavy or corrugation-like protuberances on the front. FIG. 8a shows, in the measuring cylinder arrangement, the distribution effect on the front of the lamination (protuberances) and FIG. 8b shows the distribution effect on the back of the lamination (depressions).

FIG. 9 shows the same test rig with a lamination in accordance with the invention having the same structuring on both sides.

As the trickled-over surface F and the measurement result show, a lamination according to the invention which is patterned on both sides provides a considerably better cross-distribution than the known structuring.

What is claimed is:

1. A regular packing comprising a plurality of layers, at least one of said layers being made of foil-like material and folded to define a plurality of corrugations, each said corrugation having a trickle surface including a patterned front defining continuous crossing channels and a patterned back identical to said front and defining continuous crossing channels, each continuous crossing channel being formed of a channel bottom having continuous side walls with said crossing channels of said front disposed in symmetric relation to one another about a common axis.

2. A regular packing as set forth in claim 1 wherein said axis is vertically disposed.

3. A regular packing as set forth in claim 1 wherein each crossing channel is disposed to an angle of from 20° to 70° relative to said axis.

4. A regular packing as set forth in claim 1 wherein said patterned front includes a plurality of pyramidal protuberances and pyramidal depressions.

5. A regular packing as set forth in claim 1 wherein each crossing channel has a width of from 1 to 5 millimeters and a depth of from 0.2 to 2.0 millimeters.

6. A regular packing as set forth in claim 1 wherein each of said patterned front and said patterned back has projections and depressions of a height and depth, respectively, greater than the thickness of said layer.

7. A layer of foil-like material for a regular packing, said layer having a plurality of corrugations, each corrugation having a trickle surface including a patterned front containing a plurality of protuberances and depressions of greater height and depth respectively than the thickness of the material and a patterned back of identical structure to said front, each of said back and front defining continuous crossing channels, each continuous crossing channel being formed of a channel bottom having continuous side walls with said crossing channels of said front disposed in symmetric relation to one another about a common axis.

8. A layer as set forth in claim 7 wherein said patterned front includes a plurality of pyramidal protuberances and pyramidal depressions.

9. A layer as set forth in claim 7 wherein each crossing channel has a width of from 1 to 5 millimeters and a depth of from 0.2 to 2.0 millimeters.

10. A regular packing comprising a plurality of layers, at least one of said layers being made of foil-like material and folded to define a plurality of corrugations, each said corrugation having a trickle surface including a patterned front including a plurality of protuberances and depressions defining continuous crossing capillary channels, said protuberances being disposed in abutting relation with adjacent protuberances and having side walls defining said channels therebetween and a patterned back identical to said front and defining continuous crossing capillary channels.

11. A regular packing as set forth in claim 10 wherein said crossing channels of said front are disposed in symmetric relation to one another about a common axis.

12. A regular packing as set forth in claim 10 wherein said patterned front includes a plurality of pyramidal protuberances and pyramidal depressions.

13. A regular packing comprising a plurality of layers, at least one of said layers being made of foil-like material and folded to define a plurality of corrugations, each said corrugation having a trickle surface including a patterned front defining continuous crossing capillary channels, said patterned front including a plurality of pyramidal protuberances and pyramidal depressions with each said protuberance having side edges disposed in abutting relation with side edges of adjacent protuberances to define said channels therebetween and a patterned back identical to said front and defining continuous crossing capillary channels.

14. A regular packing as set forth in claim 13 wherein each continuous crossing channel is a V-shaped channel.

15. A regular packing as set forth in claim 13 wherein said crossing channels of said front are disposed in symmetric relation to one another about a common axis.

* * * * *